United States Patent
Douais et al.

(10) Patent No.: US 8,669,307 B2
(45) Date of Patent: Mar. 11, 2014

(54) FIREPROOFING POLYAMIDE POWDERS AND THEIR USE IN A SINTERING PROCESS

(71) Applicant: Arkema France, Puteaux (FR)

(72) Inventors: Patrick Douais, Le Noyer en Duche (FR); Gregory Filou, Pont Audemer (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/651,807

(22) Filed: Oct. 15, 2012

(65) Prior Publication Data

US 2013/0041061 A1 Feb. 14, 2013

Related U.S. Application Data

(63) Continuation of application No. 11/185,307, filed on Jul. 20, 2005, now abandoned.

(60) Provisional application No. 60/616,363, filed on Oct. 6, 2004.

(30) Foreign Application Priority Data

Jul. 20, 2004 (FR) ..................................... 04 08016

(51) Int. Cl.
  *C08K 5/5313* (2006.01)

(52) U.S. Cl.
  USPC ................ 524/114; 522/2; 524/133; 524/126

(58) Field of Classification Search
  USPC ......................................................... 524/115
  See application file for complete search history.

(56) References Cited

U.S. PATENT DOCUMENTS

| | | | |
|---|---|---|---|
| 6,207,736 | B1 | 3/2001 | Nass et al. |
| 6,245,281 | B1 | 6/2001 | Scholten et al. |
| 2004/0021256 | A1 | 2/2004 | DeGrange et al. |
| 2004/0102539 | A1 | 5/2004 | Monsheimer et al. |
| 2004/0138344 | A1 | 7/2004 | Allen et al. |
| 2004/0227130 | A1 | 11/2004 | Hoerold et al. |
| 2005/0027047 | A1 | 2/2005 | Monsheimer et al. |
| 2006/0223928 | A1 | 10/2006 | Monsheimer et al. |

FOREIGN PATENT DOCUMENTS

WO   WO 2005/010087   2/2005

OTHER PUBLICATIONS

Billmeyer, Fred, Textbook of Polymer Chemisty, Third Edition, 1984, p. 410.

*Primary Examiner* — Doris Lee
(74) *Attorney, Agent, or Firm* — RatnerPrestia

(57) ABSTRACT

A subject-matter of the invention is the use of a polyamide powder possessing a fireproofing property in a process for the manufacture of an object made of polyamide by sintering this powder using radiation, the said powder comprising, by weight, 2 to 40% of at least one flame retardant for respectively 98 to 60% of at least one polyamide, the flame retardant being a blend of at least one organic phosphinate of a metal and of at least ammonium polyphosphate.

7 Claims, No Drawings

FIREPROOFING POLYAMIDE POWDERS AND THEIR USE IN A SINTERING PROCESS

This is a continuation application of U.S. application Ser. No. 11/185,307, filed on Jul. 20, 2005, which claims priority to U.S. Application No. 60/616,363, filed Oct. 6, 2004, and French Application number 04.08016, filed Jul. 20, 2004, each of which is incorporated herein by reference in its entirety for all purposes.

FIELD OF THE INVENTION

The present invention relates to fireproofing polyamide powders and to their use in a sintering process, for example a process for sintering under the action of radiation, such as a laser beam. The invention relates to compositions based on fireproofing powders (for example formed of polyamide 11 or 12) which are compatible with the technique for processing by sintering, for example, under a laser beam. The object is to develop materials which have a good performance with regard to fire resistance without this being made at the expense of the other performance characteristics of the material (viscosity/rheology/flow which are suitable for the targeted application, satisfactory level of mechanical properties) and which can be converted by a sintering technique which uses radiation, more particularly a laser sintering technique.

BACKGROUND OF THE INVENTION

The technology for sintering polyamide powders under a laser beam is used to manufacture three-dimensional objects, such as prototypes and models. A fine layer of polyamide powder is deposited on a horizontal plate maintained in a chamber heated at a temperature lying between the crystallization point CP and the melting point MP of the polyamide powder. The laser sinters powder particles at different points in the powder layer according to a geometry corresponding to the object, for example using a computer which has the shape of the object in memory and which reconstructs it in the form of slices. The horizontal plate is subsequently lowered by a value corresponding to the thickness of a powder layer (for example, between 0.05 and 2 mm and generally of the order of 0.1 mm), then a fresh powder layer is deposited and the laser sinters powder particles according to a geometry corresponding to this new slice of the object. The procedure is repeated until the complete object has been manufactured. A block of powder is obtained in which the object is present internally. The parts which were not sintered have thus remained in the powder form. Subsequently, the combined product is gently cooled and the object solidifies as soon as its temperature falls below the crystallization point CP. When completely cool, the object is separated from the powder, which can be reused in another operation.

It is recommended for the powder to have a difference MP-CP which is as great as possible in order to avoid phenomena of deformation (or curling) during manufacture. This is because, at the time $t_0$ immediately after the action of the laser beam, the temperature of the sample is greater than the crystallization point (CP) of the powder but the introduction of a fresh, colder, powder layer causes the temperature of the component to rapidly fall below the CP and brings about deformations.

Furthermore, an enthalpy of fusion ($\Delta Hf$) which is as high as possible is required in order to obtain good geometrical definition of the components manufactured. This is because, if the enthalpy of fusion is too low, the energy introduced by the laser is sufficient to sinter by thermal conduction the powder particles close to the growing walls but the geometrical precision of the component is no longer satisfactory.

It is clear that everything which has just been explained with regard to the sintering of polyamide powders under a laser beam is valid whatever the radiation which brings about the melting.

For specific uses, it is necessary for the objects obtained to have flame-retardant properties, indeed even fireproofing properties, but also to fulfil criteria for emission of fumes and for toxicity. In the continuation of the text, for simplicity, the term "fireproofing" is used for flame-retardant properties and for fireproofing properties. It is shown that organic phosphorus additives based on an organic phosphinate of a metal and on ammonium polyphosphate are suitable for the laser sintering process. It is sufficient to dry blend these products with the polyamide powder. It has also been discovered that the usual fireproofing agents for polyamides are not all suitable. For example, melamine cyanurate is not suitable.

SUMMARY OF THE INVENTION

The present invention relates to the use of a polyamide powder possessing a fireproofing property in a process for the manufacture of an object made of polyamide by sintering this powder using radiation, the said powder comprising, by weight, 2 to 40% of at least one flame retardant for respectively 98 to 60% of at least one polyamide, the flame retardant being a blend of at least one organic phosphinate of a metal and of at least one ammonium polyphosphate.

According to one embodiment, the powder is composed, by weight, of (the total forming 100%):
  2 to 40% of at least one flame retardant, the flame retardant being a blend of at least one organic phosphinate of a metal and of at least ammonium polyphosphate;
  98 to 60% of at least one polyamide; and
  at least one agent taken from UV stabilizers, antioxidants, dyes, pigments, bactericides and rheological agents.

According to one embodiment, the phosphinate used is chosen from phosphinic salts of formula (I) and diphosphinic salts of formula (II):

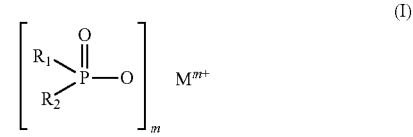

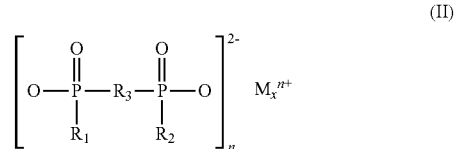

in which $R_1$ and $R_2$ are identical or different and are linear or branched $C_1$ to $C_6$ alkyl groups and/or aryl groups;
$R_3$ is a linear or branched $C_2$ to $C_{10}$ alkylene group, a $C_6$ to $C_{10}$ arylene group, a $C_6$ to $C_{10}$ alkylarylene group or a $C_6$ to $C_{10}$ arylalkylene group;
M is a calcium, aluminium and/or zinc ion;
m is 2 or 3;
n is 1 or 3;
x is 1 or 2.

According to one embodiment, the polyamide is chosen from PA 11, PA 12, aliphatic polyamides resulting from the condensation of an aliphatic diamine having from 6 to 12 carbon atoms and of an aliphatic diacid having from 9 to 18 carbon atoms, and copolyamides 11/12 having either more than 90% of 11 units or more than 90% of 12 units.

The invention also relates to an article manufactured with a polyamide powder possessing a fireproofing property, the said powder comprising, by weight, 2 to 40% of at least one flame retardant for respectively 98 to 60% of at least one polyamide, the flame retardant being a blend of at least one organic phosphinate of a metal and of at least ammonium polyphosphate, the said powder being sintered using radiation.

It also relates to the process for the manufacture of an object made of polyamide by sintering polyamide powder using radiation, the said powder comprising, by weight, 2 to 40% of at least one flame retardant for respectively 98 to 60% of at least one polyamide, the flame retardant being a blend of at least one organic phosphinate of a metal and of at least ammonium polyphosphate.

According to one embodiment, the radiation originates from a laser beam.

This powder can be prepared by simple dry blending of the constituents, this being the preferred embodiment.

It is also possible to add the flame retardant to the molten polyamide in a mixing device and to reduce the product obtained to the powder form but with, in this case, the risk of a fall in the enthalpy of fusion and the consequences mentioned above during the conversion of the powder by sintering technology.

The polyamide can be a homopolyamide or a copolyamide. It can be a blend of polyamide and of at least one other polymer, the polyamide forming the matrix and the other polymer or polymers forming the phase dispersed in the matrix.

Mention may be made, as an example of radiation, of that supplied by a laser beam (the process is then referred to as "laser sintering"). Mention may also be made of the process in which a mask is positioned between the powder layer and the source of the radiation; the powder particles protected from the radiation by the mask are not sintered.

DETAILED DESCRIPTION OF THE INVENTION

As regards the polyamide, the term "polyamide" is understood to mean the condensation products:
of one or more amino acids, such as aminocaproic, 7-aminoheptanoic, 11-aminoundecanoic and 12-aminododecanoic acids, or of one or more lactams, such as caprolactam, oenantholactam and lauryllactam;
of one or more salts or mixtures of diamines, such as hexamethylenediamine, dodecamethylenediamine, meta-xylylenediamine, bis-(p-aminocyclohexyl)methane and trimethylhexamethylenediamine, with diacids, such as isophthalic, terephthalic, adipic, azelaic, suberic, sebacic and dodecanedicarboxylic acids, as well as $C_{14}$ to $C_{18}$ diacids.

Mention may be made, as examples of polyamide, of PA 6, PA 6-6, PA 11, PA 12, PA 6-10, PA 6-12 and PA 6-14.

Use may also be made of copolyamides. Mention may be made of the copolyamides resulting from the condensation of at least two α,ω-aminocarboxylic acids or of two lactams or of one lactam and of one α,ω-aminocarboxylic acid. Mention may also be made of the copolyamides resulting from the condensation of at least one α,ω-aminocarboxylic acid (or one lactam), at least one diamine and at least one dicarboxylic acid. Mention may also be made of the copolyamides resulting from the condensation of an aliphatic diamine with an aliphatic dicarboxylic acid and at least one other monomer chosen from aliphatic diamines other than the above and aliphatic diacids other than the above.

Mention may be made, as examples of lactams, of those which have from 3 to 12 carbon atoms on the main ring and which can be substituted. Mention may be made, for example, of β,β-dimethylpropiolactam, α,α-dimethylpropiolactam, amylolactam, caprolactam, capryllactam and lauryllactam.

Mention may be made, as examples of α,ω-aminocarboxylic acid, of aminoundecanoic acid and aminododecanoic acid. Mention may be made, as examples of dicarboxylic acid, of adipic acid, sebacic acid, isophthalic acid, butanedioic acid, 1,4-cyclohexanedicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid HOOC—$(CH_2)_{10}$—COOH.

The diamine can be an aliphatic diamine having from 6 to 12 atoms; it can be saturated cyclic and/or arylic. Mention may be made, by way of examples, of hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, polyoldiamines, isophoronediamine (IPD), methylpentamethylenediamine (MPDM), bis(aminocyclohexyl)methane (BACM) or bis(3-methyl-4-aminocyclohexyl)methane (BMACM).

Mention may be made, as examples of copolyamides, of copolymers of caprolactam and of lauryllactam (PA 6/12), copolymers of caprolactam, of adipic acid and of hexamethylenediamine (PA 6/6-6), copolymers of caprolactam, of lauryllactam, of adipic acid and of hexamethylenediamine (PA 6/12/6-6), copolymers of caprolactam, of lauryllactam, of 11-aminoundecanoic acid, of azelaic acid and of hexamethylenediamine (PA 6/6-9/11/12), copolymers of caprolactam, of lauryllactam, of 11-aminoundecanoic acid, of adipic acid and of hexamethylenediamine (PA 6/6-6/11/12) or copolymers of lauryllactam, of azelaic acid and of hexamethylenediamine (PA 6-9/12).

Use may be made of blends of polyamide. These are, for example, blends of aliphatic polyamides and of semiaromatic polyamides and blends of aliphatic polyamides and of cycloaliphatic polyamides.

Mention may be made, for example, of the compositions disclosed in Patent Application EP 1 227 131 comprising, by weight, the total being 100%:
5 to 40% of an amorphous polyamide (B) which results essentially from the condensation:
either of at least one diamine chosen from cycloaliphatic diamines and aliphatic diamines and of at least one diacid chosen from cycloaliphatic diacids and aliphatic diacids, at least one of these diamine or diacid units being cycloaliphatic,
or of a cycloaliphatic α,ω-aminocarboxylic acid,
or of a combination of these two possibilities,
and optionally of at least one monomer chosen from α,ω-aminocarboxylic acids or the corresponding possible lactams, aliphatic diacids and aliphatic diamines,
0 to 40% of a flexible polyamide (C) chosen from copolymers comprising polyamide blocks and polyether blocks and copolyamides,
0 to 20% of a compatibilizing agent (D) for (A) and (B),
0 to 40% of a flexible modifier (M),
provided that (C)+(D)+(M) is between 0 and 50%,
the remainder to 100% of a semicrystalline polyamide (A).

Mention may also be made of the compositions disclosed in Patent Application EP 1 227 132 comprising, by weight, the total being 100%:
- 5 to 40% of an amorphous polyamide (B) which results essentially from the condensation of at least one optionally cycloaliphatic diamine, of at least one aromatic diacid and optionally of at least one monomer chosen from:
  - α,ω-aminocarboxylic acids,
  - aliphatic diacids,
  - aliphatic diamines,
- 0 to 40% of a flexible polyamide (C) chosen from copolymers comprising polyamide blocks and polyether blocks and copolyamides,
- 0 to 20% of a compatibilizing agent (D) for (A) and (B), (C)+(D) is between 2 and 50%
- with the condition that (B)+(C)+(D) is not less than 30%, the remainder to 100% of a semicrystalline polyamide (A).

It would not be departing from the scope of the invention to replace a portion of the polyamide with a copolymer comprising polyamide blocks and polyether blocks, that is to say to use a blend comprising at least one of the above polyamides and at least one copolymer comprising polyamide blocks and polyether blocks.

The copolymers comprising polyamide blocks and polyether blocks result from the copolycondensation of polyamide sequences comprising reactive ends with polyether sequences comprising reactive ends, such as, inter alia:
1) Polyamide sequences comprising diamine chain ends with polyoxyalkylene sequences comprising dicarboxyl chain ends.
2) Polyamide sequences comprising dicarboxyl chain ends with polyoxyalkylene sequences comprising diamine chain ends obtained by cyanoethylation and hydrogenation of aliphatic α,ω-dihydroxylated polyoxyalkylene sequences, known as polyetherdiols.
3) Polyamide sequences comprising dicarboxyl chain ends with polyetherdiols, the products obtained being, in this specific case, polyetheresteramides. Use is advantageously made of these copolymers.

The polyamide sequences comprising dicarboxyl chain ends originate, for example, from the condensation of α,ω-aminocarboxylic acids, of lactams or of dicarboxylic acids and diamines in the presence of a chain-limiting dicarboxylic acid.

The polyether can be, for example, a polytetramethylene glycol (PTMG). The latter is also known as polytetrahydrofuran (PTHF).

The number-average molar mass $\overline{Mn}$ of the polyamide sequences is between 300 and 15 000 and preferably between 600 and 5000. The mass $\overline{Mn}$ of the polyether sequences is between 100 and 6000 and preferably between 200 and 3000.

The polymers comprising polyamide blocks and polyether blocks can also comprise randomly distributed units. These polymers can be prepared by the simultaneous reaction of the polyether and of the precursors of the polyamide blocks.

For example, polyetherdiol, a lactam (or an α,ω-amino acid) and a chain-limiting diacid can be reacted in the presence of a small amount of water. A polymer is obtained which has essentially polyether blocks and polyamide blocks, the latter being of highly variable length, but also the various reactants which have reacted randomly, which are distributed statistically along the polymer chain.

These polymers comprising polyamide blocks and polyether blocks, whether they originate from the copolycondensation of polyamide and polyether sequences prepared beforehand or from a one-stage reaction, exhibit, for example, Shore D hardnesses which can be between 20 and 75 and advantageously between 30 and 70 and an intrinsic viscosity between 0.8 and 2.5, measured in meta-cresol at 25° C. for an initial concentration of 0.8 g/100 ml. The MFI values can be between 5 and 50 (235° C. under a load of 1 kg).

The polyetherdiol blocks are either used as is and copolycondensed with polyamide blocks comprising carboxyl ends or are aminated, in order to be converted into polyetherdiamines, and condensed with polyamide blocks comprising carboxyl ends. They can also be blended with polyamide precursors and a chain-limiting agent in order to prepare polymers comprising polyamide blocks and polyether blocks having statistically distributed units.

Polymers comprising polyamide and polyether blocks are disclosed in U.S. Pat. Nos. 4,331,786, 4,115,475, 4,195,015, 4,839,441, 4,864,014, 4,230,838 and 4,332,920.

The ratio of the amount of copolymer comprising polyamide blocks and polyether blocks to the amount of polyamide can be, by weight, between 1/99 and 15/85.

As regards the blend of polyamide and of at least one other polymer, it is provided in the form of a blend comprising a polyamide matrix and the other polymer or polymers form the phase dispersed in this matrix. Mention may be made, as examples of this other polymer, of polyolefins, polyesters, polycarbonates, PPO (abbreviation for polyphenylene oxide), PPS (abbreviation for polyphenylene sulphide) or elastomers.

The invention is of particular use for polyamides chosen from PA 11, PA 12, aliphatic polyamides resulting from the condensation of an aliphatic diamine having from 6 to 12 carbon atoms and of an aliphatic diacid having from 9 to 18 carbon atoms, and copolyamides 11/12 having either more than 90% of 11 units or more than 90% of 12 units.

Mention may be made, as examples of aliphatic polyamide resulting from the condensation of an aliphatic diamine having from 6 to 12 carbon atoms and of an aliphatic diacid having from 9 to 12 carbon atoms, of:
PA 6-12, resulting from the condensation of hexamethylenediamine and of 1,12-dodecanedioic acid,
PA 9-12, resulting from the condensation of $C_9$ diamine and of 1,12-dodecanedioic acid,
PA 10-10, resulting from the condensation of $C_{10}$ diamine and of 1,10-decanedioic acid,
PA 10-12, resulting from the condensation of $C_9$ diamine and of 1,12-dodecanedioic acid.

With regard to the copolyamides 11/12 having either more than 90% of 11 units or more than 90% of 12 units, they result from the condensation of 11-aminoundecanoic acid with lauryllactam (or α,ω-amino($C_{12}$) acid).

It would not be departing from the scope of the invention to use a blend of polyamides.

The polyamide can, before being blended with the fireproofing agent, be treated with water or with steam according to the process disclosed in Patent EP 1 413 595. In this patent, the disclosure is made of a process for enhancing at least one of the following two parameters of a polyamide: (i) its melting point and (ii) its enthalpy of fusion $\Delta Hf$, in which process:
  this polyamide is brought into contact in the solid state with water or steam at a temperature close to its crystallization point CP for a period of time sufficient to bring about this enhancement,
  then the water (or the steam) is separated from the polyamide and the polyamide is dried.

The polyamide can be a homopolyamide or a copolyamide. It can be a blend of polyamide and of at least one other polymer, the polyamide forming the matrix and the other polymer or polymers forming the dispersed phase.

Advantageously, the polyamide is in the divided form, such as powder or granules. The granules thus treated can subsequently be ground to form powders.

The treatment with water or with steam can also be preceded by a conventional treatment with methanol to extract the possible oligomers present in the polyamide.

According to another form, the water or the steam can comprise methanol. It is thus possible simultaneously to extract oligomers or impurities present in the polyamide to be treated. In this form of the invention, it is recommended to rinse the polyamide before drying it in order to thoroughly remove any traces of methanol.

As regards the fireproofing agents or flame retardants, their proportion is between 2 and 40% by weight, advantageously between 5 and 35%, for respectively 98 to 60% and 95 to 65% by weight of polyamide. Preferably, it is between 5 and 30% by weight for respectively 95 to 70% of polyamide. It is also possible, in addition to the organic phosphinates of a metal and the ammonium polyphosphate, to add zinc borate as synergist. The proportion of zinc borate can be between 0 and 10% by weight for respectively 100 to 90% by weight of the fireproofing agent or flame retardant, the total (synergist+fireproofing agent) forming 100% by weight.

As regards the powders, they can be of different sizes. For example, the powders of use in the laser sintering process can have a size of up to 350 µm and advantageously have a size of between 10 and 100 µm. Preferably, the D50 is 60 µm (that is to say, 50% of the particles have a size of less than 60 µm).

As regards their preparation, it can be carried out by simple dry blending of the constituents. The usual mixers for powdered products, for example Henschel® mixers, can be used. Blending is carried out at standard temperature and pressure. The blending time must be sufficient for the blend to be homogeneous; this time can be between 2 and 15 minutes.

It is also possible to add the fireproofing agent to the molten polyamide in a mixing device and to reduce the product obtained to the powder form. The blending time must be sufficient for the blend to be homogeneous. An extruder, for example, is used. The product recovered in the form of granules at the extruder outlet is then subsequently ground to the same particle size cited for the polyamide powder used in the dry blend process.

The powder of the invention can also comprise additives UV stabilizers, antioxidants, dyes, pigments or bactericides, inter alia. These products are preferably incorporated in the polyamide before the addition of the fireproofing agent.

The invention will now be described in more detail. The percentages are expressed by weight.

1) Manufacture of PA Powders Possessing Fireproofing Properties

A polyamide powder blend is formulated using a Henschel® rapid mixer and by incorporating therein PA 11 suitable for sintering under a laser beam with a D50 of 48 µm and treated according to Patent FR 2 846 333 A1 with a melting point of 201° C. and an enthalpy of fusion of 105 J/g, a blend of flame retardants being added according to the proportions defined below along with 0.6% of a phenolic antioxidant and 0.1% of a fumed silica as rheological agent. The blending time is 150 s. The blend thus prepared is sieved through a cloth having an opening of 160 µm.

The nature of the flame retardants, their proportions and the proportion of PA are set out in the description of the examples and comparative examples below.

2) Conversion of the PA Powder Possessing Fireproofing Properties

The powder blend prepared according to the above manufacturing process 1) is charged to a laser sintering device used to manufacture objects in three dimensions by depositing a fine layer of polyamide powder on a horizontal surface maintained in a chamber heated to a temperature lying between the crystallization point and the melting point. The laser sinters powder particles according to a geometry corresponding to the object, for example using a 3D System Vanguard® device which has the shape of the object in memory and which reconstructs it in the form of slices.

Plaques with a size of 12×3 inches and with a thickness of 0.05 of an inch are manufactured for fire tests. The combustion time in seconds (s) and the combustion length in inches are measured on these plaques. The fire properties are satisfactory when the combustion length is <6 inches and the combustion time is as short as possible.

Three comparative examples (Cp1 to Cp3) of a PA blend with various flame retardants which are unsuitable for the invention will now be described:

With Melamine Cyanurate (Cp1)

A powder blend comprising 89.3% of PA 11, 10% of melamine cyanurate (for example, Melapur C25) as flame retardant, 0.6% of a phenolic antioxidant and 0.1% of a fumed silica as rheological agent is manufactured according to the process described in 1) above. However, during the phase of conversion of the powder, the process for which is disclosed in 2), the components in the course of manufacture by laser sintering are observed to deform.

With Ammonium Phosphate (Cp2)

A powder blend comprising 89.3% of PA 11, 10% of ammonium phosphate (for example, Exolit AP 752) as flame retardant, 0.6% of a phenolic antioxidant and 0.1% of a fumed silica as rheological agent is manufactured according to the process described in 1). However, during the phase of conversion of the powder described in 2), it is found that this composition is not very suitable for the construction of components due to the sublimation of a compound in the manufacturing chamber which tends to weaken the power of the laser beam and to foul the construction chamber. Furthermore, the components obtained do not show satisfactory fire resistance properties since the combustion time is 129 s.

With Ammonium Polyphosphate (Cp3)

A powder blend comprising 89.3% of PA 11, 10% of ammonium polyphosphate (for example, Exolit AP 423) as flame retardant, 0.6% of a phenolic antioxidant and 0.1% of a fumed silica as rheological agent is manufactured according to the process described in 1). However, during the phase of conversion in 2), it is found that this composition is not very suitable for the construction of components due to the formation of fumes in the manufacturing chamber which tend to weaken the power of the laser beam. Furthermore, the components obtained do not show satisfactory fire properties since the combustion length is 8.9 inches, whereas the objective to be achieved must be <6 inches, and the combustion time is 116 s. It is thus found that melamine cyanurate, ammonium phosphate and ammonium polyphosphate, alone, do not make it possible to obtain a composition suitable for the use which it is desired to make thereof.

Two examples (Ex. 1 and Ex. 2) of a PA blend with flame retardants appropriate to the invention will now be described:

With 10% of a Phosphinate/Ammonium Polyphosphate Blend (Ex. 1)

A powder blend comprising 89.3% of PA 11, 10% of a blend of phosphorous compounds (Exolit OP1311 from Clariant) as flame retardant, 0.6% of a phenolic antioxidant and 0.1% of a fumed silica as rheological agent is formulated as described in 1). After conversion of the powder thus obtained according to the conversion process described in 2), the components manufactured show satisfactory fire properties since the combustion length is 3 inches and the combustion time is 36 s. The elongation at break is 49% and the tensile strength is 40 MPa (ASTM 638).

With 15% of a Phosphinate/Ammonium Polyphosphate Blend (Ex. 2)

A powder blend comprising 84.3% of PA 11, 15% of a blend of phosphorus compounds (Exolit OP1311 from Clariant) as flame retardant, 0.6% of a phenolic antioxidant and 0.1% of a fumed silica as rheological agent is formulated as described in 1). The components obtained on conclusion of the conversion described in 2) show satisfactory fire properties with a combustion length of 3.6 inches and a combustion time of 23 s. The elongation at break is 32% and the tensile strength is 36 MPa (ASTM 638).

When a powder comprising 99.3% of PA 11, 0.6% of a phenolic antioxidant and 0.1% of a fumed silica as rheological agent is prepared according to 1) with 0% of flame retardant, the combustion is greater than 10 inches, the elongation at break is 52% and the tensile strength is 39 MPa (ASTM 638).

A marked reduction in the combustion time is found, without this having a damaging effect on the mechanical properties of the objects manufactured with the composition according to the invention by the sintering process.

The invention claimed is:

1. A process for the manufacture of an object made of polyamide comprising sintering a polyamide powder using a laser beam, said polyamide powder having an average particle size of 10 to 100 microns and comprising a) copolyamide 11/12 having more than 90% of PA 11 units; b) by weight, 5 to 30% of at least one flame retardant for respectively 95 to 70% by weight of the at least one polyamide, the flame retardant being a blend of at least one organic phosphinate of a metal and of at least one ammonium polyphosphate; c) zinc borate; and d) at least one agent selected from the group consisting of UV stabilizers, antioxidants, dyes, pigments, bactericides and fillers.

2. A process according to claim 1, wherein the proportion of the zinc borate is between 5 and 10% in weight for respectively 95 to 90% of polyamide.

3. A process according to claim 1, comprising an additional step prior to sintering of preparing the polyamide powder by dry blending of a), b), c) and d).

4. A process according to claim 1, comprising additional steps prior to sintering of adding the flame retardant to polyamide in a melted state in a compounding device and reducing the product obtained to form the polyamide powder.

5. A process according to claim 4, wherein the product obtained is in the form of granules and the granules are ground to form the polyamide powder.

6. A process according to claim 1, wherein the polyamide powder has a $D_{50}$ of 60 micrometers.

7. An article made by the process of claim 1.

* * * * *